United States Patent
Heller

(10) Patent No.: US 8,412,897 B2
(45) Date of Patent: *Apr. 2, 2013

(54) BACKUP OF MEDIA LIBRARIES

(75) Inventor: David Heller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 12/492,043

(22) Filed: Jun. 25, 2009

(65) Prior Publication Data

US 2009/0271457 A1    Oct. 29, 2009

Related U.S. Application Data

(63) Continuation of application No. 11/520,050, filed on Sep. 11, 2006, now Pat. No. 7,574,574.

(51) Int. Cl.
*G06F 13/00* (2006.01)

(52) U.S. Cl. .................................................... 711/162

(58) Field of Classification Search .................. None
See application file for complete search history.

(56) References Cited

U.S. PATENT DOCUMENTS

| 5,535,381 | A | 7/1996 | Kopper |
| 5,751,997 | A | 5/1998 | Kullick et al. |
| 5,867,668 | A | 2/1999 | Spirakis et al. |
| 6,694,200 | B1 * | 2/2004 | Naim ........................... 700/94 |
| 7,017,076 | B2 * | 3/2006 | Ohno et al. ...................... 714/15 |
| 7,227,073 | B2 * | 6/2007 | Kim ................................ 84/609 |
| 7,266,574 | B1 * | 9/2007 | Boudrie et al. ................ 707/646 |
| 7,574,574 | B2 | 8/2009 | Heller et al. |
| 2004/0064476 | A1 * | 4/2004 | Rounds ...................... 707/104.1 |
| 2004/0064630 | A1 * | 4/2004 | Nakashika ........................ 711/4 |
| 2005/0010616 | A1 * | 1/2005 | Burks ........................... 707/204 |
| 2005/0055444 | A1 | 3/2005 | Venkatasubramanian |
| 2006/0075293 | A1 * | 4/2006 | Bodlaender ..................... 714/13 |
| 2008/0028008 | A1 | 1/2008 | Brunet et al. |

FOREIGN PATENT DOCUMENTS

| WO | WO 94/08337 | 4/1994 |
| WO | WO 2004/057474 | 7/2004 |

OTHER PUBLICATIONS

Invitation to Pay Additional Fees with Partial International Search, re: PCT/US2007/078129, mailed Apr. 4, 2008.
International Search Report and Written Opinion for PCT/US2007/078129, mailed Jun. 10, 2008.
Office Action for U.S. Appl. No. 11/520,050, mailed Sep. 15, 2008.
Final Office Action for U.S. Appl. No. 11/520,050, mailed Feb. 26, 2009.
Notice of Allowance for U.S. Appl. No. 11/520,050, mailed May 7, 2009.

* cited by examiner

*Primary Examiner* — Duc Doan

(57) ABSTRACT

The disclosed embodiments support the backup of the contents of a media library, or a portion thereof, on one or more storage mediums. More particularly, the contents of the media library may include one or more media items and/or playlists. Once backed up, the contents stored on the storage mediums may be restored to the media library.

18 Claims, 9 Drawing Sheets

BACKUP OF MEDIA LIBRARIES

CROSS-REFERENCE TO RELATED APPLICATION

This application is a continuation of U.S. patent application Ser. No. 11/520,050, filed Sep. 11, 2006, and entitled "BACKUP OF MEDIA LIBRARIES", now U.S. Pat. No. 7,574,574, which is hereby incorporated by reference herein.

BACKGROUND OF THE INVENTION

1. Field of the Invention

The present invention relates to backing up media libraries and, more particularly, to backing up items in a media library on multiple storage mediums.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming. Normally, client-side programs assist a user with interaction via the Internet with a server computer that stores available media files. In this way, a user of a client-side program is able to browse, preview, purchase and/or download available media files over the Internet.

Once media files have been downloaded, it is often desirable to backup the media files. This is particularly important where the downloaded media files have been purchased from an online media store, since it would be undesirable to have to re-purchase the same media files in the event of a loss of data. In order to backup the media files, it is typically necessary to manually copy the desired media files to a storage medium. This manual backup process is tedious and time-consuming.

Thus, there is a need for an improved backup process that enhances user satisfaction.

SUMMARY OF THE INVENTION

The disclosed embodiments support the backup of the contents of a media library, or a portion thereof, on one or more storage mediums. More particularly, the contents of the media library may include one or more media items and/or playlists. Once backed up, the contents of the media library stored on the storage mediums may be restored to the media library.

In accordance with one embodiment, a backup of a media library may be performed on a set of storage mediums, which may be of different types. For instance, the storage mediums may include compact disks (CDs) and/or digital video disks (DVDs). The storage capacity of a storage medium on which the contents of at least a portion of the media library is to be stored is determined. One or more media items and/or playlists in the media library are stored on the storage medium. The storing process is performed until the storage capacity of the storage medium has been fully utilized, at which point the process may be performed for another storage medium. The backup process ends when the content of the media library has been completely backed up.

In accordance with one embodiment, the media items that are backed up may include audio data, video data, image data, or podcast episodes. For instance, video data may include television episodes or movies. Some of the media items may have been purchased from an online media store, while others may have been obtained via the Internet or another source.

In accordance with yet another embodiment, a media library that has been previously backed up on one or more storage mediums may be restored. A storage medium is received. One or more media items and/or playlists on the storage medium are restored such that the media items and/or playlists are stored on a computer on which the media library is being restored. It is determined whether all of the storage mediums have been restored. The process may continue until all of the storage mediums have been restored.

The invention can be implemented in numerous ways, including as a method, system, device, apparatus, graphical user interface, or computer readable medium. Several embodiments of the invention are discussed below.

As a method of performing a backup of a media library, one embodiment of the invention can, for example, include at least: obtaining a plurality of storage mediums on which content of at least a portion of the media library is to be stored; storing digital content for a plurality of media items in the media library to at least one of the plurality of storage mediums; and storing at least one playlist in the media library to each of the plurality of storage mediums.

As a method of restoring a media library that has previously been backed up on a plurality of storage mediums, one embodiment of the invention can, for example, include at least: restoring, from the plurality of storage mediums to a computer where the media library is being restored, digital content for a plurality of media items as well as at least one playlist previously stored on the plurality of storage mediums; obtaining a sequential identifier from each of the plurality of storage mediums from which data has been restored; tracking all sequential identifiers associated with each the plurality of storage mediums from which data has been restored; determining whether a total number of storage mediums associated with the backup is known; and comparing the total number of storage mediums with the sequential identifiers that have been tracked if the total number of storage mediums is known.

As a computer-readable storage medium storing thereon instructions for performing a backup of a media library, the backup of the media library being stored to a plurality of storage mediums, one embodiment of the invention can, for example, include at least: instructions for storing digital content for a plurality of media items in the media library to at least one of the plurality of storage mediums; and instructions for storing at least one playlist in the media library to each of the plurality of storage mediums.

As an apparatus for performing a backup of a media library, one embodiment of the invention can, for example, include at least: a processor; a memory for storing a media library; and a removable storage drive capable of successively receiving a plurality of storage mediums on which content of at least a portion of the media library is to be stored. The memory can store and the processor can perform instructions for storing digital content for a plurality of media items in the media library to at least one of the plurality of storage mediums, and instructions for storing at least one playlist in the media library to each of the plurality of storage mediums.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention relates to backing up media libraries. More particularly, the disclosed embodiments relate to backing up media assets on a plurality of storage mediums. A media asset can, for example, be a podcast episode, television episode, audio, video, or image data.

Embodiments of various aspects of the invention are discussed below with reference to FIGS. 1-7. However, those skilled in the art will readily appreciate that the detailed description given herein with respect to these figures is for explanatory purposes as the invention extends beyond these limited embodiments.

One aspect of the invention pertains to a system and method for backing up media items stored in a media library. Those media items that are backed up may include, for example, media items that are purchased from an online media store. In order to purchase a media item from the online media store, a potential purchaser can search and browse through numerous media items that are available for purchase. Upon purchasing a media item, the media item is downloaded and stored in a media library. In addition, the media item may be identified in a playlist.

The content for the media item may be encrypted for the purchaser's use and stored on the purchaser's machine. Thereafter, the purchaser can make use of the media item (e.g., play the media item). However, the use of the media item can still be limited. For example, only up to a predetermined number user machines can be authorized to use the media item, or only up to a predetermined number of compact disc copies can be made of a grouping or collection of media items (e.g., a playlist).

Figure 1:
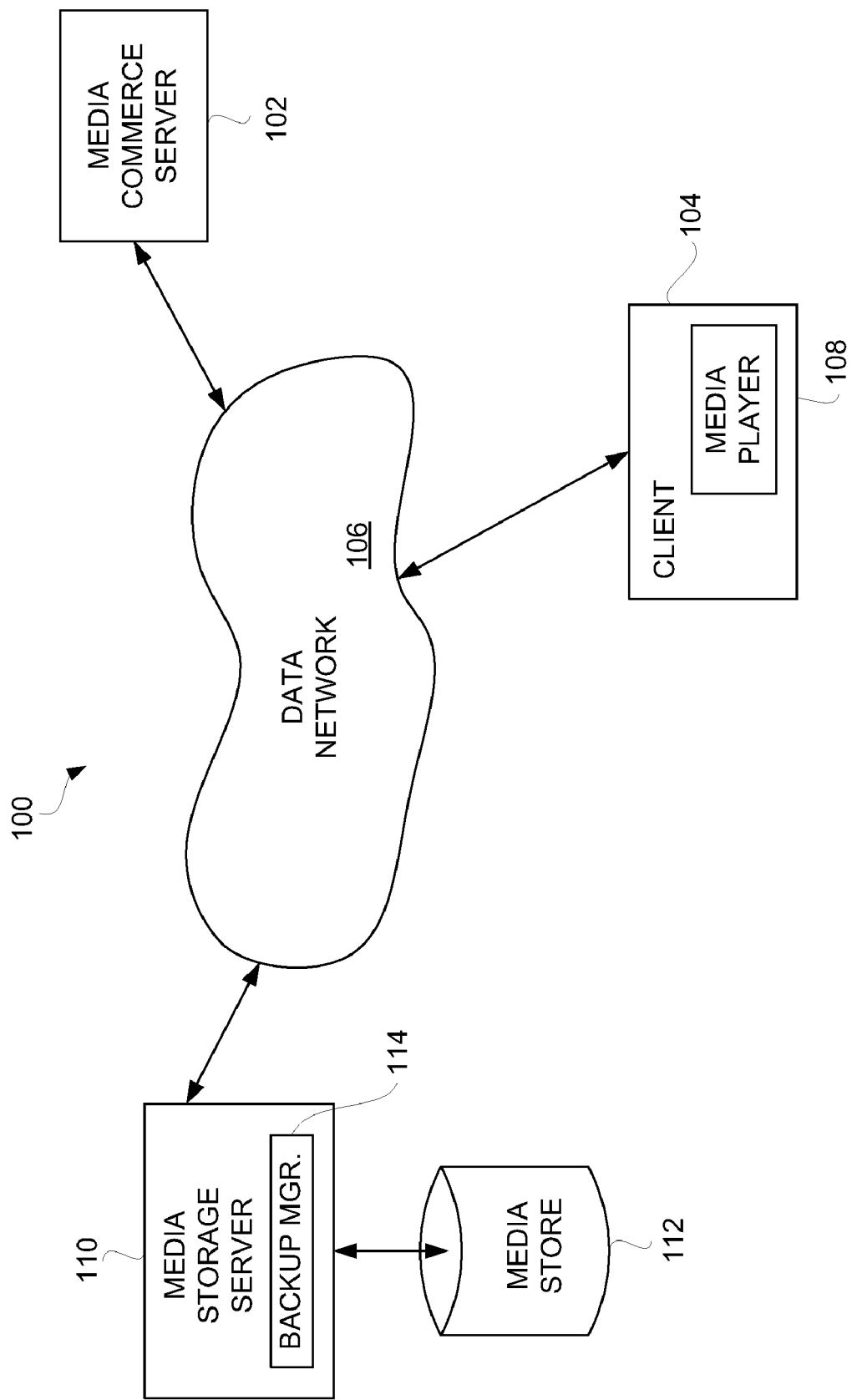
FIG. 1 is a block diagram of a media purchase system according to one embodiment of the invention.

FIG. 1 is a block diagram of a media purchase system 100 according to one embodiment of the invention. The media purchase system 100 includes a media commerce server 102. The media commerce server 102 coordinates review and/or purchase of media items through on-line transactions. On-line transactions to purchase media items is also referred to as electronic commerce (e-commerce). The media purchase system 100 also includes a client 104. Typically, the media purchase system 100 would include a plurality of different clients 104. Each client 104 includes a media player 108. The media player 108 is an application program (e.g., software application) that operates on the client 104, which is a computing device. The client 104 is coupled to the media commerce server 102 through a data network 106. Hence, any of the clients 104 can interact with the media commerce server 102 to review and/or purchase media items. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media storage server 110 and a media store 112. The media storage server 110 represents a remote storage server that couples to the data network 106. The media store 112 provides mass storage of the numerous media items that are available for purchase via the media purchase system 100. Once purchased, the media items can be accessed from the media store 112 over the data network 106 by way of the media storage server 110.

More particularly, the media purchase system 100 allows a user of the client 104 to utilize the media player 108 to browse, search or sort through a plurality of media items that can be purchased from the media commerce server 102. The media player 108 may also allow the user to preview a media clip of the media items. In the event that the user of the media player 108 desires to purchase a particular media item, the user (via the media player 108) and the media commerce server 102 engage in an on-line commerce transaction in which the user pays for access rights to the particular media item. In one embodiment, a credit card associated with the user is credited for the purchase amount of the particular media item.

In the media purchase system 100 shown in FIG. 1, the media items are stored in the media store 112 and retrieved via the media storage server 110. Hence, the media commerce server 102 need not burden its resources to deliver any of the media items that may be purchased to the client 104. Instead, on purchasing a particular media item, the media commerce server 102 may send download information to the media player 108 on the client 104. The download information can then be used by the media player 108 (and the client 104) to retrieve the media content for the particular media item by interacting with the media storage server 110 through the data network 106. In this regard, the media storage server 110 obtains the media content corresponding to the particular media item from the media store 112 and downloads such content through the data network 106 to the client 104. The downloaded media content can then be stored on the client 104. In one embodiment, the downloaded media content is stored on the client 104 as received. In another embodiment, the downloaded media content is transcrypted from one encryption key to another encryption key before persistent storage on the client 104. In still another embodiment, the downloaded media content is encrypted as received at the client 104 but is decrypted and then re-encrypted before persistent storage on the client 104. Thereafter, the media player 108 can present (e.g., play) the media content at the client 104.

The connections through the data network 106 between the media commerce server 102, the client 104 and the media storage server 110 can be through secure connections, such as Secure Sockets Layer (SSL). Further, the media content may be stored at the client 104 in an encrypted manner.

As discussed in greater detail below, in accordance with one embodiment, a user may backup a media library on one or more storage mediums in an intelligent manner using a backup manager 114 at the client 104. For instance, each storage medium may be a compact disk (CD) or digital video disk (DVD). It is important to note that the type of each storage medium need not be identical.

Figure 2:
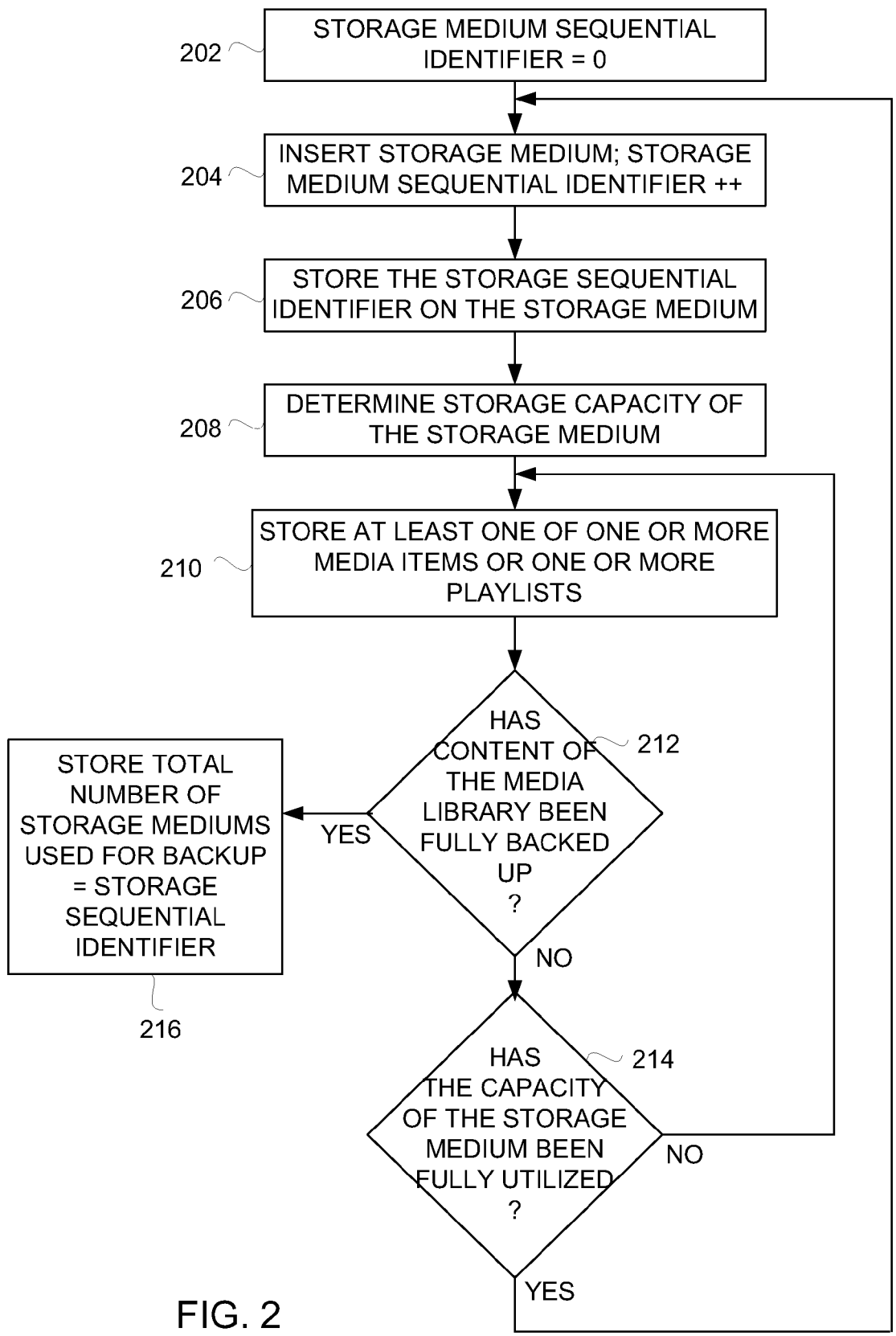
FIG. 2 is a process flow diagram illustrating a general method of performing a backup of a media library in accordance with one embodiment of the invention.

FIG. 2 is a process flow diagram illustrating a general method of performing a backup of a media library in accordance with one embodiment of the invention. In accordance with one embodiment, the number of storage mediums used during the backup of the media library is ascertained and stored on the last storage medium used during the backup. This enables the total number of storage mediums used during the backup to be easily retrieved during the restore process. However, since the amount of data that can be stored on each storage medium will vary depending upon the type of each storage medium used, the number of storage mediums that will be used cannot be determined until all of the data has been backed up. As a result, a storage medium sequential identifier may be used in order to keep track of the number of storage mediums that have been used during the backup of the media library. Thus, the storage medium sequential identifier may be initialized to zero at 202. When a new storage medium is inserted for backup, the storage medium sequential identifier may be incremented at 204.

In accordance with one embodiment, the storage medium sequential identifier may be stored on the storage medium at 206. In this manner, a unique identifier may be stored on each storage medium used during the backup process. From the unique identifier, it is possible to track which storage mediums were used to restore the media library during the restore process. In addition, it is also possible to identify the order in which the storage medium was used during the backup from the storage medium sequential identifier, should the order become relevant during the restore process.

Since different types of storage mediums may be used during the backup process, the storage capacity of the storage medium may be determined at 208 in order to ascertain the amount of data that can be stored on the storage medium. At least a portion of the media library may then be stored on the storage medium at 210. More particularly one or more media items and/or one or more playlists from the media library may be stored on the storage medium. In accordance with one embodiment, a copy of each of the playlists in the media library is stored on each storage medium on which the content of at least a portion of the media library is stored. This enables the user to access his or her playlists, even when the content of all of the storage mediums has not yet been restored. Of course, the media content corresponding to each of the items in the playlist may not be accessible if the media content was not yet restored.

If the content of the media library has not been completely backed up at 212, the process continues at 214 to determine whether the capacity of the storage medium has been fully utilized. If the capacity of the storage medium has been fully utilized, the process continues at 204 at which point a new storage medium is inserted. More particularly, the user may be prompted for insertion of another storage medium. If the content of the media library has been completely backed up, the storage medium sequential identifier may be stored as the total number of storage mediums used during the backup at 216.

Figure 3:
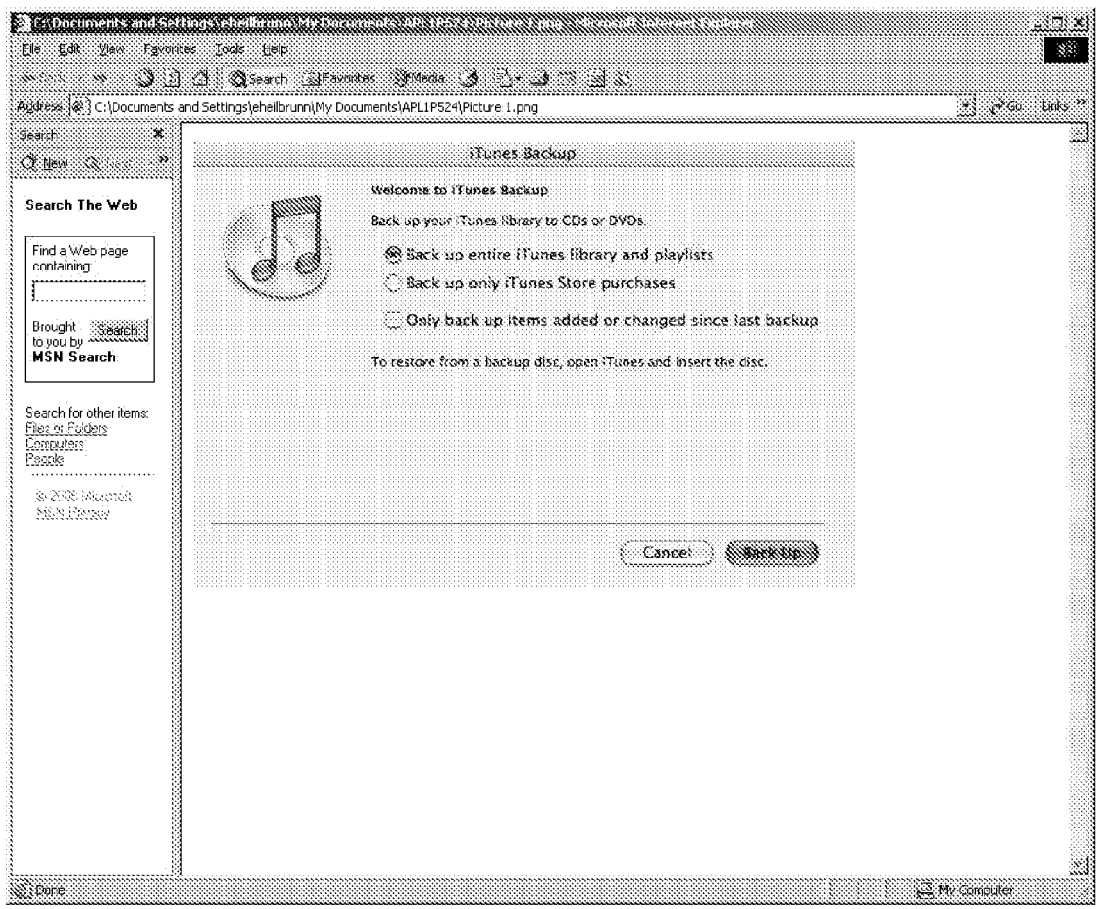
FIG. 3 is a screen shot of a representative application program window that displays a list of backup options in accordance with one embodiment of the invention.

When a user wishes to backup a media library such as an iTunes™ media library, the user may access a user interface (i.e., application program window) displaying a list of backup options. FIG. 3 is a screen shot of a representative application program window that displays a list of backup options in accordance with one embodiment of the invention. In this example, the first backup option is to backup the entire media library including all media items and playlists in the media library. The second backup option presented in this example is to back up only media items in the media library purchased from the online media store. The second backup option does not backup playlists. The third backup option illustrated in FIG. 3 enables the user to back up only media items added to the media library since the last backup or media items that have changed since the last backup. The third option does not backup playlists.

Figure 4A:
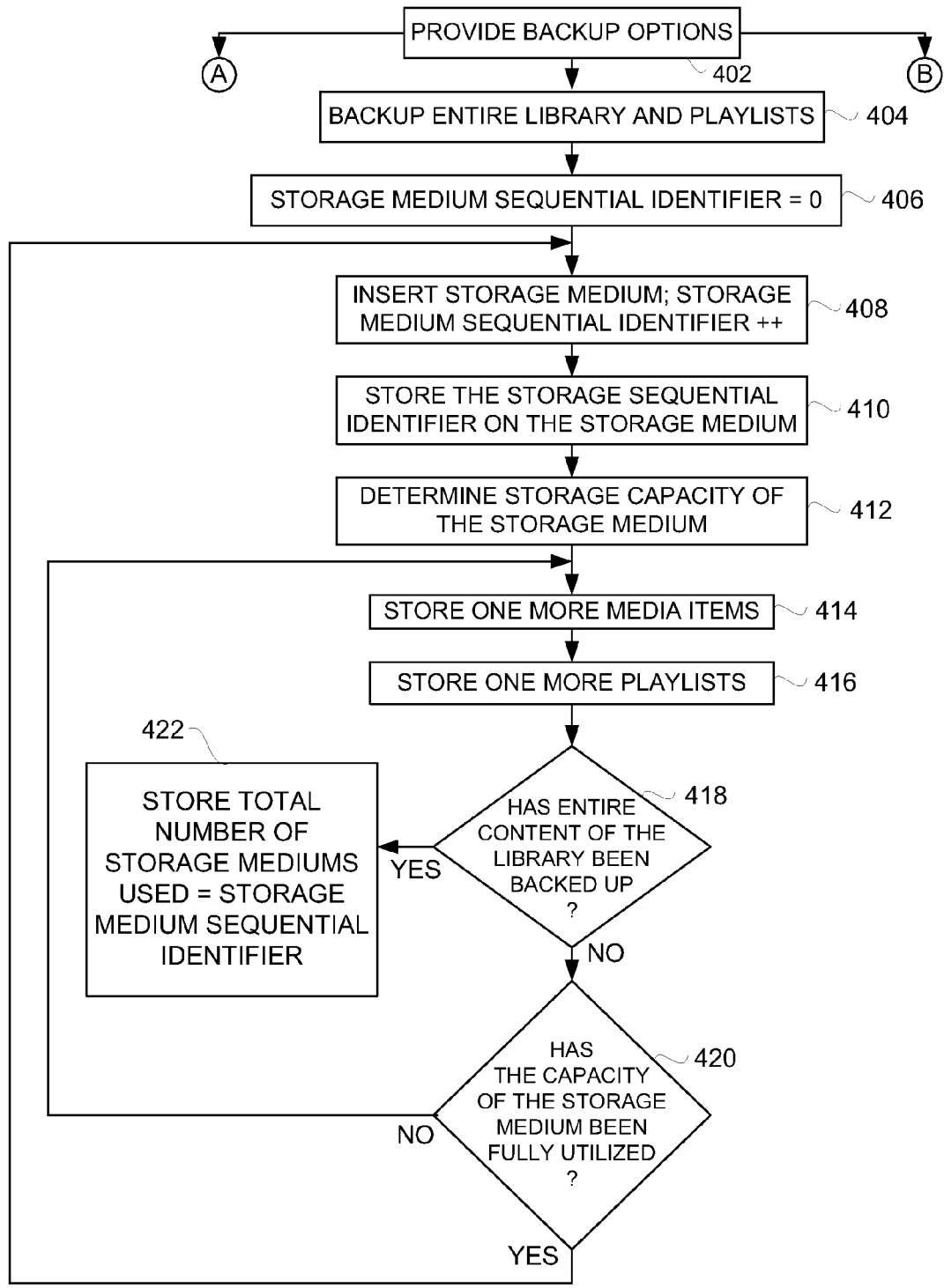
FIGS. 4A-4C are process flow diagrams illustrating a method of performing a backup of a media library in accordance with the backup option selected from the backup options presented as shown in FIG. 3 in accordance with one embodiment of the invention.
Figure 4B:
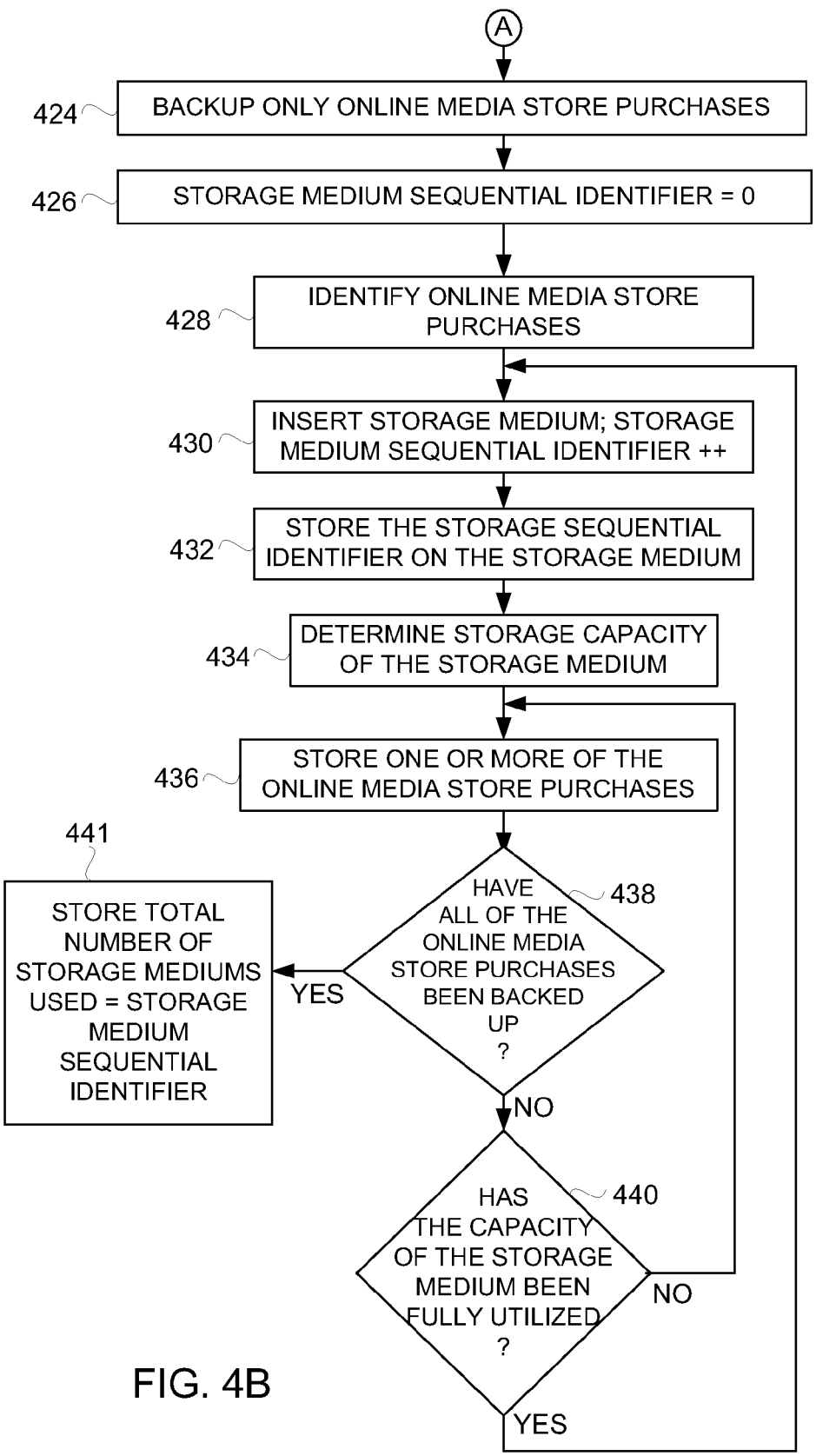
Figure 4C:
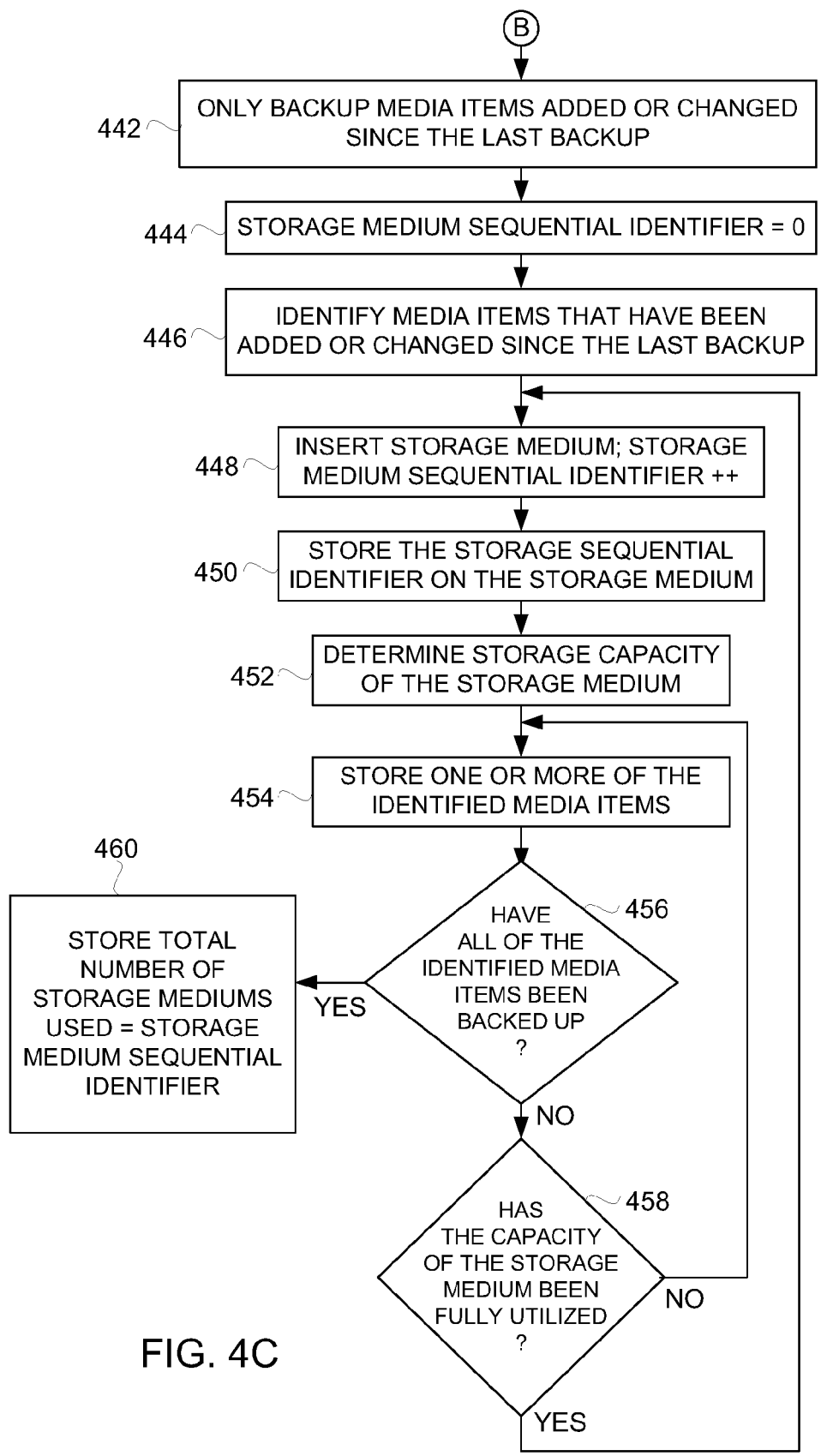

As described above, the user may select one of a number of backup options. FIGS. 4A-4C are process flow diagrams illustrating a method of performing a backup of a media library in accordance with a backup option selected from the backup options presented as shown in FIG. 3 in accordance with one embodiment of the invention. As shown at 402, the backup options are provided at 402. If the user selects the first option to backup the entire library and corresponding playlists at 404, a storage medium sequential identifier may be initialized to zero at 406. A storage medium may be inserted at 408 and the storage medium sequential identifier may be incremented at 408. The storage medium sequential identifier may be stored on the storage medium at 410. The capacity of the storage medium may also determined at 412. One or more media items may be stored on the storage medium at 414. In addition, one or more playlists may be stored on the storage medium at 416. Of course, it is possible that a single storage medium may store only media items or playlists. If the content of the entire library has not been backed up at 418 and the capacity of the storage medium has not been fully utilized at 420, the process continues at 414 to continue storing items in the media library on the storage medium. If the content of the entire library has not been backed up at 418 and the capacity of the storage medium has been fully utilized at 420, the process continues at 408 for an additional storage medium. If the entire content of the library has been backed up at 418, the total number of storage mediums used for the backup may be stored on the storage medium at 422.

If the user selects the second option to backup only online media store purchases at 424, a storage medium sequential identifier may be initialized to zero at 426. All online media store purchases in the media library may be identified at 428. A storage medium may be inserted at 430 and the storage medium sequential identifier may be incremented. The storage medium sequential identifier may be stored on the storage medium at 432. The capacity of the storage medium may also be determined at 434. One or more media items that were purchased from the online media store may be stored on the storage medium at 436. If the content of the entire library has not been backed up at 438 and the capacity of the storage medium has not been fully utilized at 440, the process continues at 436 to continue storing online media store purchases from the media library on the storage medium. If the content of the entire library has not been backed up at 438 and the capacity of the storage medium has been fully utilized at 440, the process continues at 430 for an additional storage medium. If the entire content of the library has been backed up at 438, the total number of storage mediums used for the backup may be stored on the storage medium at 441.

If the user selects the third option to backup media items added to the media library or changed since the last backup at 442, a storage medium sequential identifier may be initialized to zero at 444. Once the date and/or time of the last backup has been ascertained, all online media items that have been added to the media library or changed since the last backup may be identified at 446. A storage medium may be inserted at 448 and the storage medium sequential identifier may be incremented. The storage medium sequential identifier may be stored on the storage medium at 450. The capacity of the storage medium may also be determined at 452. One or more of the identified media items may be stored on the storage medium at 454. If the content of the entire library has not been backed up at 456 and the capacity of the storage medium has not been fully utilized at 458, the process continues at 454 to continue storing online media store purchases from the media library on the storage medium. If the content of the entire library has not been backed up at 456 and the capacity of the storage medium has been fully utilized at 458, the process continues at 448 for an additional storage medium. If the entire content of the library has been backed up at 456, the total number of storage mediums used for the backup may be stored on the storage medium at 460.

Figure 5:
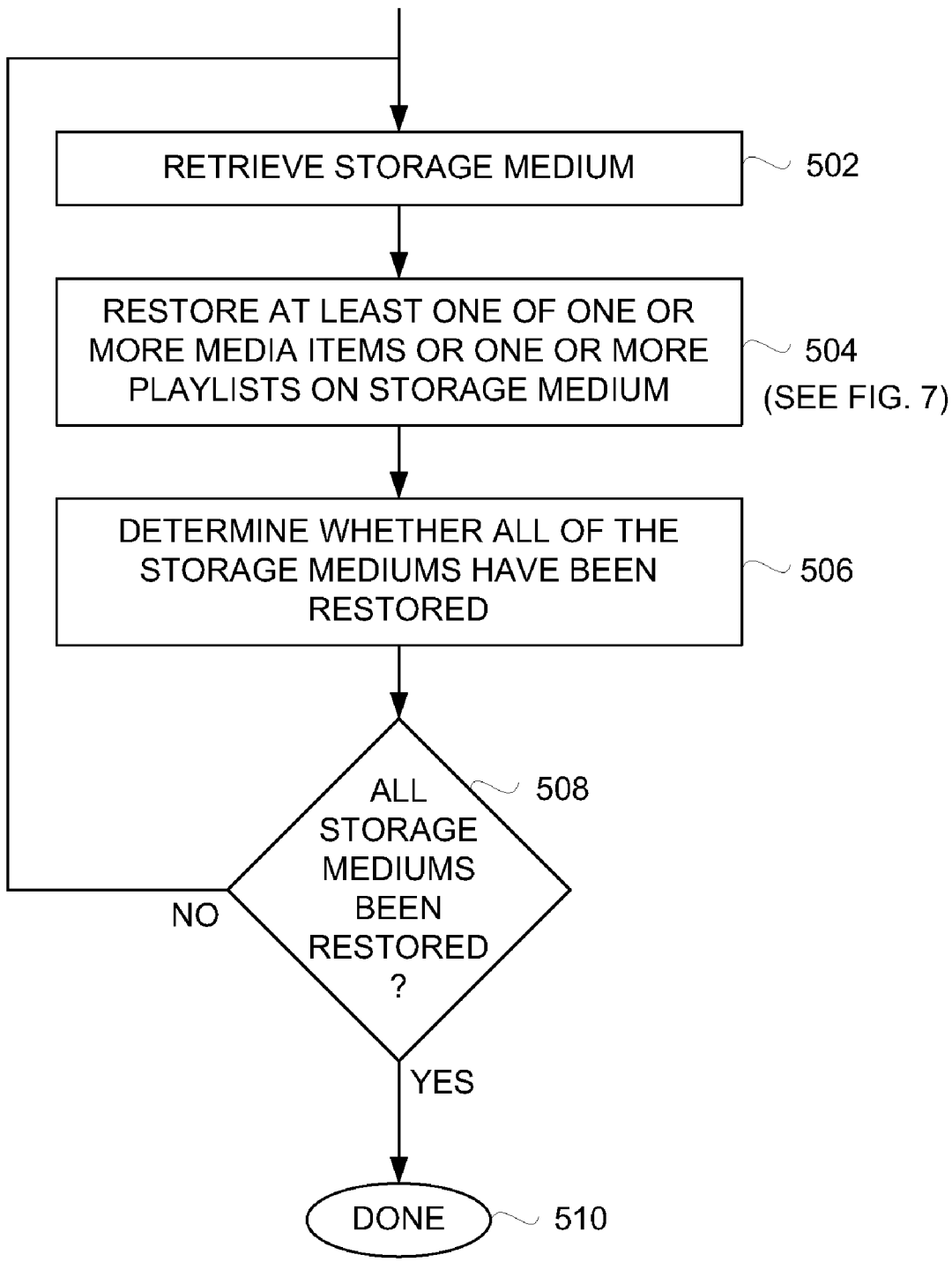
FIG. 5 is a process flow diagram illustrating a general method of restoring a media library from a set of storage mediums in accordance with one embodiment of the invention.

Once a media library has been backed up on a set of storage mediums, the media library may be restored at a later time from the set of storage mediums. FIG. 5 is a process flow diagram illustrating a general method of restoring a media library from a set of storage mediums in accordance with one embodiment of the invention. A storage medium is received at 502. At least one of the media items and/or playlists on the storage medium are restored at 504. More particularly, each of the media items and playlists on the storage medium may be restored such that the media items and playlists are stored on a computer (e.g., within a media library). One method of restoring a media item or playlist in a media library will be described in further detail below with reference to FIG. 7. Where the same playlist is stored on all of the storage mediums, the playlist need not be restored from each of the storage mediums. It may be determined whether all of the storage mediums have been restored at 506. If all of the storage mediums have been restored at 508, the process ends at 510. Otherwise, the process continues at 502 for the remaining storage mediums used for the backup.

Figure 6:
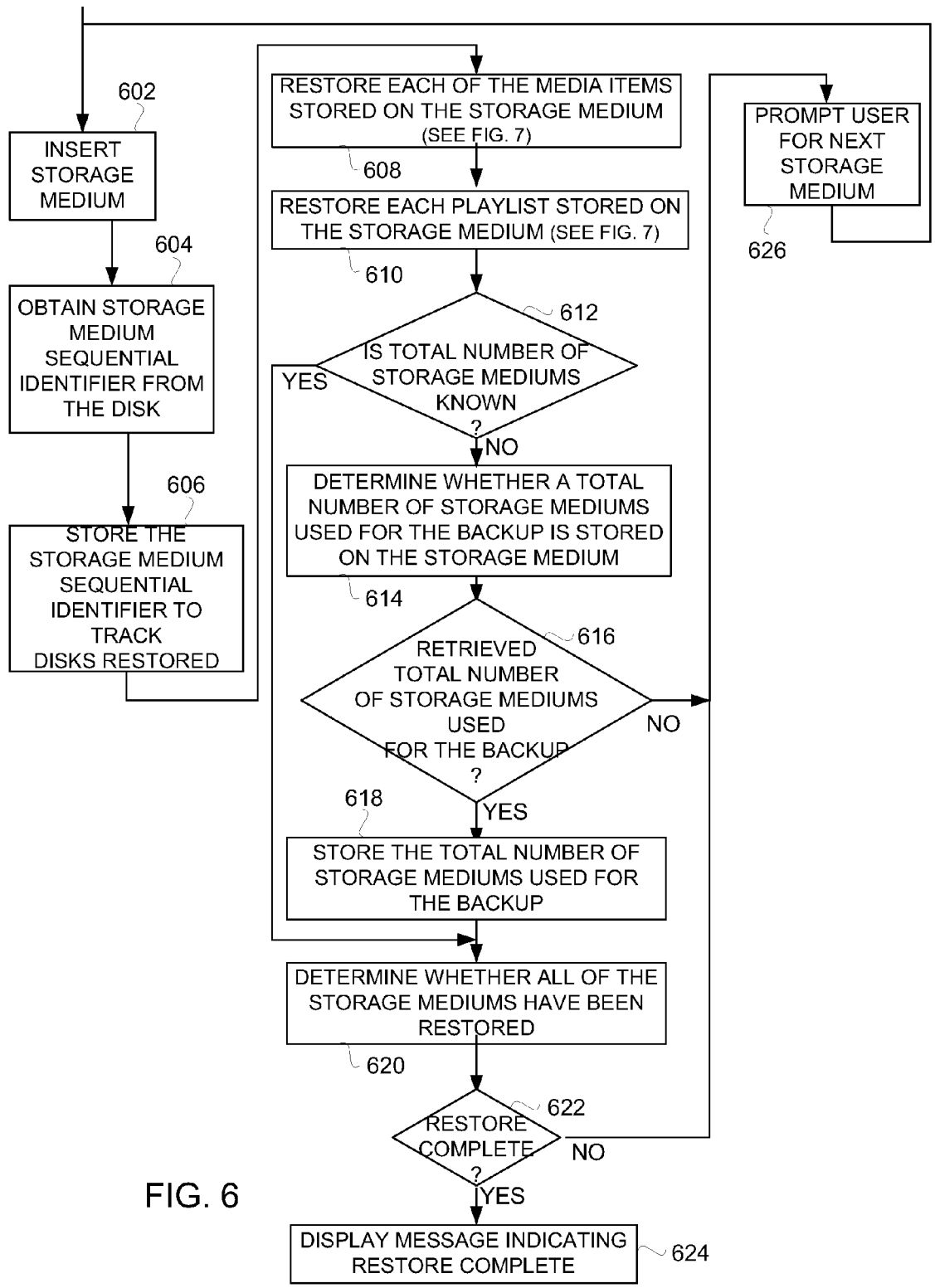
FIG. 6 is a process flow diagram illustrating a method of restoring a media library in accordance with one embodiment of the invention.

FIG. 6 is a process flow diagram illustrating a more detailed method of restoring a media library in accordance with one embodiment of the invention. As shown at 602, a storage medium may be inserted. A storage medium sequential identifier may be obtained from the storage medium at 604. The storage medium sequential identifier may then be stored at 606 to track the storage mediums that have been restored. Each of the media items stored on the storage medium may be restored at 608. In addition, each playlist stored on the storage medium may be restored at 610. One method of restoring a media item or playlist in a media library will be described in further detail below with reference to FIG. 7.

If the total number of storage mediums (e.g., disks) is not known at 612, it is determined whether a total number of storage mediums used for the backup is stored on the storage medium at 614. If the total number of storage mediums used for the backup has been retrieved from the storage medium at 616, the total number of storage mediums used for the backup may be stored at 618. If the total number of storage mediums used for the backup was not stored on the storage medium and therefore has not been retrieved at 616, the process continues at 626, at which time the user may be prompted for the next storage medium, which may be inserted at 602. If the total number of disks is already known at 612, the process continues at 620.

Since the total number of storage mediums used for the backup is known, it is determined whether all of the storage mediums have been restored at 620. This may be accomplished by comparing the total number of storage mediums with the sequential identifiers that have been tracked for those storage mediums that have already been restored. If the restore is complete at 622, a message indicating that the restore process is complete may be displayed at 624. If the restore is not complete, the user may be prompted for the next storage medium at 626.

As set forth above, once a media library has been backed up on a set of storage mediums, the contents of the media library may be restored from the storage mediums. Restoring the contents of a media library may include restoring a media item or a playlist. While it is generally desirable to restore all files that have been backed up, there are a variety of circumstances in which this would be undesirable. As one example, the file being restored may already be present in the media library. For instance, the user may have propagated an error in a playlist that was stored during backup, but which was later fixed by the user. By automatically restoring the playlist, the user would be restoring an erroneous file that he has already corrected.

In accordance with one embodiment of the invention, an overwrite setting may indicate whether the contents of a file in the media library should be overwritten during the restore process. The overwrite setting may be a default setting. Alternatively, the overwrite setting may be established by a user. The overwrite setting when in a first state (i.e., on) results in the overwriting of a file in the media library, while the overwrite setting when in a second state (i.e., off) results in the file not being overwritten and therefore not being restored.

Figure 7:
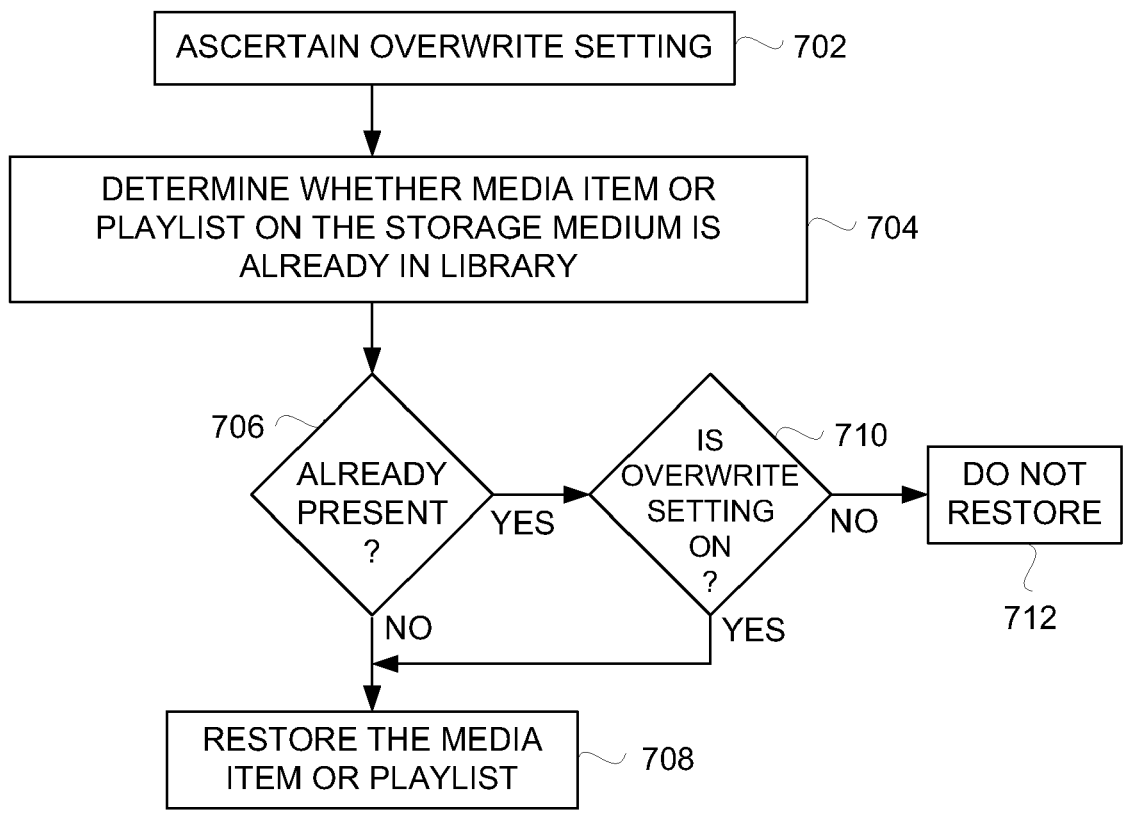
FIG. 7 is a process flow diagram illustrating a method of restoring a media item or playlist of a media library in accordance with one embodiment of the invention.

FIG. 7 is a process flow diagram illustrating a method of restoring a media item or playlist of a media library in accordance with one embodiment of the invention. As shown at 702, the overwrite setting is ascertained at 702. It is determined whether the media item or playlist on the storage medium is already present in the media library at 704. If the media item or playlist is not already present in the media library at 706, the media item or playlist is restored at 708. However, if the media item or playlist is already present in the media library at 706, if the overwrite setting is not on at 710, the media item or playlist is not restored at 712. In other words, the version of the media item or playlist obtained from the storage medium is not stored in the media library. If the media item or playlist is already present in the media library at 706, if the overwrite setting is on at 710, the media item or playlist is restored at 708, thereby overwriting the previous file.

The disclosed embodiments enable the contents of a media library to be backed up on a set of storage mediums. The contents of a media library may include one or more playlists and/or media items. The media items can pertain to audio items (e.g., audio files or songs, such as for music or audiobooks), video items (e.g., video files, television episodes, or movies), podcast episodes, or image items (e.g., photos). The storage mediums may be the same or different types. Once the backup is completed, the media library may be restored from the set of storage mediums. The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that media items and/or playlists are able to be backed up from a user's machine to a set of storage mediums. Another advantage is that the storage mediums may be of different types, and may therefore have different storage capacities. Still another advantage is that the backed up media library content may be restored from the set of storage mediums to the user's media library.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of performing a backup of a media library, comprising:
    obtaining a plurality of storage mediums on which content of at least a portion of the media library is to be stored;
    storing digital content for a plurality of media items in the media library to at least one of the plurality of storage mediums;
    storing at least one playlist in the media library to each of the plurality of storage mediums, and
    storing a sequential identifier on each of the storage mediums, the sequential identifier being a unique identifier used to identify an order in which each of the storage mediums were used.

2. The method as recited in claim 1, further comprising:
    determining whether the content of the media library has been completely backed up; and
    storing a total number of storage mediums used for the backup on at least one of the storage mediums.

3. The method as recited in claim 1, further comprising:
    providing a user interface including a set of backup options.

4. The method as recited in claim 3, wherein the set of backup options includes at least one of backing up all media items and playlists in the media library, backing up only media items in the media library purchased from an online store, or backing up only media items that have either been added to the media library since a last backup or that have been changed since the last backup.

5. The method as recited in claim 1, the method further comprising:
    identifying each of the media items in the media library that have been purchased from an online media store,
    wherein the storing of the digital content for a plurality of media items stores only those media items in the media library that have been purchased from the online media store.

6. The method as recited in claim 1, wherein the storing of the digital content for a plurality of media items stores only those items in the media library that have been added to the media library since a last backup or changed since the last backup.

7. The method as recited in claim 6, further comprising:
    identifying each media item in the media library that has been added to the media library since the last backup; and
    identifying each media item in the media library that has been changed since the last backup;
    wherein the storing of the digital content for a plurality of media items stores only the identified media items that have been added to the media library since the last backup and the identified media items that have been changed since the last backup.

8. The method as recited in claim 1, further comprising:
    restoring each of the media items and at least one playlist on the storage mediums such that the media items and the at least one playlist are stored on a computer.

9. A method of restoring a media library that has previously been backed up on a plurality of storage mediums, comprising:
    restoring, from the plurality of storage mediums to a computer where the media library is being restored, digital content for a plurality of media items as well as at least one playlist previously stored on the plurality of storage mediums;
    obtaining a sequential identifier from each of the plurality of storage mediums from which data has been restored, the sequential identifier being a unique identifier stored therein to identify an order in which the plurality of the storage mediums were used;
    tracking all sequential identifiers associated with each the plurality of storage mediums from which data has been restored;
    determining whether a total number of storage mediums associated with the backup is known; and
    comparing the total number of storage mediums with the sequential identifiers that have been tracked if the total number of storage mediums is known.

10. The method as recited in claim 9, further comprising:
    ascertaining whether a total number of storage mediums used for the backup is present on the storage medium;
    when the total number of storage mediums used for the backup is present on the storage medium, obtaining the total number of storage mediums used for the backup from the storage medium.

11. The method as recited in claim 9, further comprising:
    determining when all of the plurality of storage mediums have had data therefrom restored; and
    displaying a message indicating that the restore of the media library is complete.

12. The method as recited in claim 9, further comprising:
    determining when all of the plurality of storage mediums have had data therefrom restored; and
    providing a prompt for an additional storage medium if all of the storage mediums have not been restored.

13. A computer-readable storage medium storing thereon instructions for performing a backup of a media library, the backup of the media library being stored to a plurality of storage mediums, comprising:

instructions for storing digital content for a plurality of media items in the media library to at least one of the plurality of storage mediums;

instructions for storing at least one playlist in the media library to each of the plurality of storage mediums, and instructions for storing a sequential identifier on each of the storage mediums, the sequential identifier being a unique identifier used to identify an order in which each of the storage mediums were used.

14. The computer-readable storage medium as recited in claim 13, wherein said computer readable medium further comprises:

instructions for identifying each media item in the media library that has been purchased from an online media store.

wherein the digital content for a plurality of media items in the media library being stored on the plurality of storage mediums are only for those of the media items in the media library that have been purchased from the online media store.

15. The computer-readable storage medium as recited in claim 13, wherein said computer readable medium further comprises:

instructions for subsequently restoring, from the plurality of storage mediums to a computer where the media library is being restored, digital content for the plurality of media items as well as the at least one playlist previously stored on the plurality of storage mediums.

16. The computer-readable storage medium as recited in claim 15, wherein said computer readable medium further comprises:

instructions for obtaining a sequential identifier from each of the plurality of storage mediums from which data has been restored;

instructions for tracking all sequential identifiers associated with each the plurality of storage mediums from which data has been restored;

instructions for determining whether a total number of storage mediums associated with the backup is known; and instructions for comparing the total number of storage mediums with the sequential identifiers that have been tracked if when the total number of storage mediums is known.

17. An apparatus for performing a backup of a media library, comprising:

a processor;

a memory for storing a media library; and a removable storage drive capable of successively receiving a plurality of storage mediums on which content of at least a portion of the media library is to be stored, wherein the memory stores and the processor is capable of performing:

instructions for storing digital content for a plurality of media items in the media library to at least one of the plurality of storage mediums;

instructions for storing at least one playlist in the media library to each of the plurality of storage mediums, and instructions for storing a sequential identifier on each of the storage mediums, the sequential identifier being a unique identifier used to identify an order in which each of the storage mediums were used.

18. The apparatus as recited in claim 17, wherein the memory stores and the processor is capable of performing:

instructions for identifying each media item in the media library that has been purchased from an online media store, wherein the digital content for a plurality of media items in the media library being stored on the plurality of storage mediums are only for those of the media items in the media library that have been purchased from the online media store.

* * * * *